US011492839B1

(12) United States Patent
Goetz et al.

(10) Patent No.: US 11,492,839 B1
(45) Date of Patent: Nov. 8, 2022

(54) PORTABLE LOCKER AND DOCKING STATION SYSTEM

(71) Applicant: Wells Fargo Bank, N.A., San Francisco, CA (US)

(72) Inventors: Darren M. Goetz, Salinas, CA (US); Chris Kalaboukis, San Jose, CA (US); Lisa R. Magana, San Francisco, CA (US); Andrew L. Martinez, San Francisco, CA (US); Uma Meyyappan, Freemont, CA (US); Dennis E. Montenegro, Concord, CA (US); Marla M. Pacis, Daly City, CA (US); Timothy R. Ward, Mesa, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/100,627

(22) Filed: Nov. 20, 2020

Related U.S. Application Data

(63) Continuation of application No. 16/171,102, filed on Oct. 25, 2018, now Pat. No. 10,871,023.

(51) Int. Cl.
| E05G 1/00 | (2006.01) |
| G06Q 20/10 | (2012.01) |
| E05B 39/00 | (2006.01) |
| E05G 1/10 | (2006.01) |
| E05G 1/04 | (2006.01) |
| E05B 65/52 | (2006.01) |

(52) U.S. Cl.
CPC ............. *E05G 1/005* (2013.01); *E05B 39/00* (2013.01); *E05B 65/52* (2013.01); *E05G 1/04* (2013.01); *E05G 1/10* (2013.01); *G06Q 20/10* (2013.01)

(58) Field of Classification Search
CPC . E05G 1/005; E05G 1/04; E05B 39/00; E05B 65/52; G06Q 20/10
See application file for complete search history.

(56) References Cited

U.S. PATENT DOCUMENTS

| 4,743,743 | A | 5/1988 | Fukatsu |
| 9,141,876 | B1 * | 9/2015 | Jones ...................... G07D 11/36 |
| 9,214,048 | B2 * | 12/2015 | Brexel .................... G07D 11/12 |
| 9,741,010 | B1 * | 8/2017 | Heinla ................. G06Q 10/083 |
| 10,222,798 | B1 * | 3/2019 | Brady ................ G06Q 10/0832 |
| 2014/0330428 | A1 | 11/2014 | Wolfe et al. |
| 2016/0301849 | A1 * | 10/2016 | E ........................ H04M 1/72415 |
| 2018/0089619 | A1 * | 3/2018 | High ...................... B65D 90/48 |
| 2018/0246526 | A1 * | 8/2018 | Wilkinson ............ G08B 21/182 |

* cited by examiner

*Primary Examiner* — Thomas D Alunkal
(74) *Attorney, Agent, or Firm* — Foley & Lardner LLP

(57) ABSTRACT

A system includes a plurality of portable lockers. Each of the portable lockers includes a lockable compartment configured to contain contents. The system also includes a docking station that includes a vault configured to secure the plurality of portable lockers, a user input device configured to receive a request from a user to take a first portable locker of the plurality of portable lockers, a biometrics sensor configured to collect a biometric from the user, and a processing circuit. The processing circuit is configured to determine, based on the biometric, whether the user has permission to take the first portable locker and control the vault to release the first portable locker to the user in response to a determination that the user has permission to take the first portable locker.

20 Claims, 6 Drawing Sheets

PORTABLE LOCKER AND DOCKING STATION SYSTEM

CROSS-REFERENCE TO RELATED APPLICATION

This application is a continuation of U.S. patent application Ser. No. 16/171,102, filed Oct. 25, 2018, the entire disclosure of which is incorporated by reference herein.

BACKGROUND

Managers and owners of businesses or other organizations often need to rely on employees or other individuals to carry valuable objects (e.g., cash) between a business location and some other location, for example a bank branch. Individuals carrying such valuable objects may have easy opportunities to misappropriate the valuable objects entrusted to them or may be easy targets for muggings or thefts while the valuable objects are in transit. Furthermore, such valuable objects may be targets of theft attempts while located at a business or at another location (e.g., at a bank branch), for example by those tasked with counting or otherwise handling the valuable objects. The risk of theft or other loss of valuable objects in transit, in use, and in storage may therefore be substantial.

SUMMARY

One implementation of the present disclosure is a system. The system includes a portable locker. The portable locker includes a compartment configured to receive contents and a lid coupled to the compartment and configured to contain the contents within the compartment. The lid is openable to allow the contents to be removed from the compartment. The portable locker also includes a lock coupled to at least one of the lid or the compartment and controllable between a locked position to prevent the lid from opening and an unlocked position to allow the lid to open, and a processing circuit communicably coupled to the lock. The processing circuit is configured to determine whether the portable locker is located at a preset destination, in response to a determination that the portable locker is not located at the preset destination, control the lock to the locked position, and in response to a determination that the portable locker is located at the preset destination, control the lock to the unlocked position.

Another implementation of the present disclosure is a method. The method includes locking contents within a portable locker, securing the portable locker within a docking station, receiving, by the docking station, a request from a user to take the portable locker, determining whether the user has permission to take the portable locker, in response to a determination that the user has permission to take the portable locker, releasing the portable locker from the docking station, determining, by the portable locker, whether the portable locker is located at a preset destination, and, in response to a determination that the portable locker is located at the preset destination, unlocking the portable locker to allow access to the contents.

Another implementation of the present disclosure is a system. The system includes a plurality of portable lockers. Each of the portable lockers includes a lockable compartment configured to contain contents. The system also includes a docking station that includes a vault configured to secure the plurality of portable lockers, a user input device configured to receive a request from a user to take a first portable locker of the plurality of portable lockers, a biometrics sensor configured to collect a biometric from the user, and a processing circuit. The processing circuit is configured to determine, based on the biometric, whether the user has permission to take the first portable locker and control the vault to release the first portable locker to the user in response to a determination that the user has permission to take the first portable locker. The first portable locker is configured to prevent the user from opening the lockable compartment of the first portable locker until the first portable locker reaches a preset destination.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Referring generally to the FIGURES, systems and methods for secure ordering, storage, transit, and handling of valuables such as cash and checks are shown, according to exemplary embodiments. In the systems and methods described herein, a provider docking station, a user docking station, a portable locker, a user device, and a provider computing system provide a coordinated, unified, comprehensive technical solution to security risk associated with ordering, storing, moving, and handling valuables. For example, the systems and methods described herein provide multiple stages of biometric screening and related security checks to ensure that a person gaining access to a portable locker and accessing valuables in the portable is authorized to do so, tracks movement of a portable locker and its contents, and provides other security features, without gaps in security that may be present in other approaches that require a combination of separate systems in various phases of ordering, moving, and handling valuables. The systems and methods described herein thereby provide significant technical advantages that may be of value to business owners or managers or other individuals responsible for the transit and handling of valuables.

Figure 1:
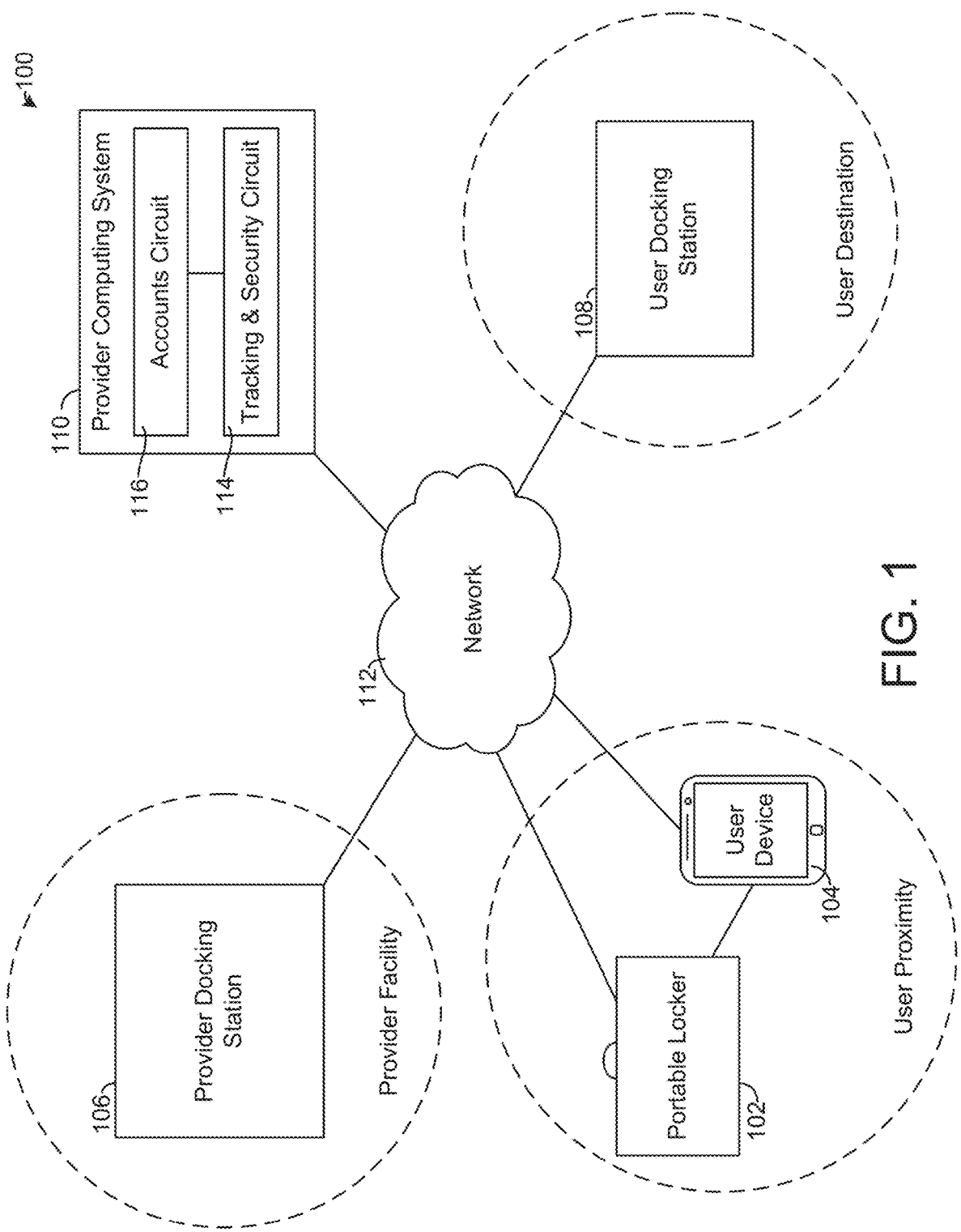
FIG. 1 is a block diagram of a system for secure storage, transit, and handling of valuables, according to an exemplary embodiment.

Referring to FIG. 1, a system 100 for secure ordering, storage, transit, and handling of valuables such as cash and checks is shown. The system 100 is shown to include a portable locker 102, a user device 104, a provider docking station 106, a user docking station 108, and a provider computing system 110, all communicably coupled to each other via a network 112.

The network 112 provides communicable and operative coupling between the portable locker 102, the user device 104, the provider docking station 106, the user docking station 108, and the provider computing system 110. In various embodiments, the network 112 includes any type or types of network, including wired (e.g., Ethernet, optical fiber) and/or wireless networks (e.g., 802.11X, ZigBee, Bluetooth, Wi-Fi). In some embodiments, the network 112 includes or is included with the Internet. In further embodiments, the network 112 includes a proprietary banking network to provide secure or substantially secure communications.

The user device 104 is a personal computing device of a user (e.g., of a courier of the portable locker 102). In some embodiments, the user device 104 is a single-purpose device associated with the system 100 and manufactured particularly for use with the portable locker 102 and/or the provider docking station 106 and user docking station 108. According to various or other embodiments, the user device 104 may include one or more commercially-available multi-purpose devices, including smartphones, tablets, laptops, personal gaming devices, wearable devices (e.g., smartwatch, headset), etc. In some embodiments, the user device 104 includes a device implanted in a user, for example a specialty tracking device that is safely-embeddable within a person and configured to provide the functions attributed to the user device 104 herein. The user device 104 may be associated with a particular person or business and may facilitate authentication, security, and tracking in the system 100.

The user device 104 includes a network interface (e.g., cellular modem, Wi-Fi gateway) that provides communication between the user device 104 and the network 112. The user device 104 also includes a short-range wireless signal generator (e.g., Bluetooth transceiver) configured to emit a short range signal that may be received by the portable locker 102. The short-range wireless signal from the user device 104 may indicate to the portable locker 102 that the portable locker 102 is located proximate the user device 104 (e.g., within a threshold distance of the user device 104). In some embodiments, the user device 104 includes an input/output device (e.g., touchscreen) configured to display information relating to the system 100 and receive user input relating to the system 100.

The portable locker 102 facilitates secure transportation of contents of the portable locker 102, for example cash, checks, or other valuable items. FIG. 1 shows the portable locker 102 in transit between the provider docking station 106 and the user docking station 108. As described in detail below, the portable locker 102 is configured to prevent access to the contents of the portable locker 102 unless the portable locker 102 is located at a user destination, for example at or proximate the user docking station 108. The portable locker 102 is also configured to be received by and secured by the provider docking station 106 and the user docking station 108, as described in detail below. The portable locker 102 is communicably coupled to the user device 104, the provider docking station 106, the user docking station 108, and/or the provider computing system 110 via network 112. In some embodiments, the portable locker 102 communicates with the network 112 via the user device 104.

In some embodiments, the portable locker 102 is wirelessly tethered to the user device 104, for example based on a Bluetooth or other short-range wireless connection between the portable locker 102 and the user device 104. In such a case, the portable locker 102 is configured to detect whether the portable locker 102 is within a range of the user device 104 (e.g., close enough to maintain the short-range wireless connection) and emit a sound (e.g., alarm) and/or transmit a threat notification to the provider computing system 110 when the portable locker 102 is out of range of the user device 104. The portable locker 102 thereby encourages the user to keep the portable locker 102 within a proximity of the user.

The provider docking station 106 securely stores multiple portable lockers 102 and can release a portable locker 102 to an authorized user on demand from the authorized user. As illustrated in FIG. 1, the provider docking station 106 may be located at a provider facility (e.g., a bank branch, retail store, etc.) or some other public or semi-public location. The provider docking station 106 is resistant to burglary attempts, for example in conformance with Underwriters Laboratories standards UL 687 and/or UL 771. The provider docking station 106 may collect biometrics (e.g., fingerprint(s), handprint(s), retinal scan) from the user for use in authenticating the user's permission to access a portable locker. The provider docking station 106 may communicate with the provider computing system 110 to authenticate the user's permission to access a portable locker 102. The provider docking station 106 may thereby substantially prevent theft of portable lockers 102 and contents thereof from the provider docking station 106.

In some embodiments, the provider docking station 106 receives order information for the user from the provider computing system 110 and/or the user device 104 that specifies ordered contents (e.g., cash of various denominations, change, etc.) of the portable locker 102 for the user. The provider docking station 106 may then associate a portable locker 102 stored in the provider docking station 106 with the user, automatically load the ordered contents into the portable locker 102, and lock the ordered contents within the portable locker 102. The user may then take the portable locker 102 from the provider docking station 106 (i.e., after one or more security checks as described herein) to receive the ordered contents.

In some embodiments, the provider docking station 106 is configured to receive a portable locker 102 from a user including returned contents contained in the portable locker 102. The returned contents may include deposits (e.g., cash, checks) to be credited to an account of the user. In some cases, the provider docking station 106 identifies the contents of the portable locker 102 returned by the user, for example by counting cash and/or collecting information relating to checks (e.g., account number, routing number, amount) contained in the portable locker 102. The provider docking station 106 may provide the information relating to the returned contents to the provider computing system 110 to facilitate updates to account values for the user (e.g., a bank account of the user or the user's employer) and/or execution of electronic bank transfers corresponding to checks found in the portable locker 102. The provider docking station 106 may empty the portable locker 102 to prepare the portable locker 102 to be refilled based on a new order. The provider docking station 106 may thereby securely receive and automatically process deposits.

Figure 4:
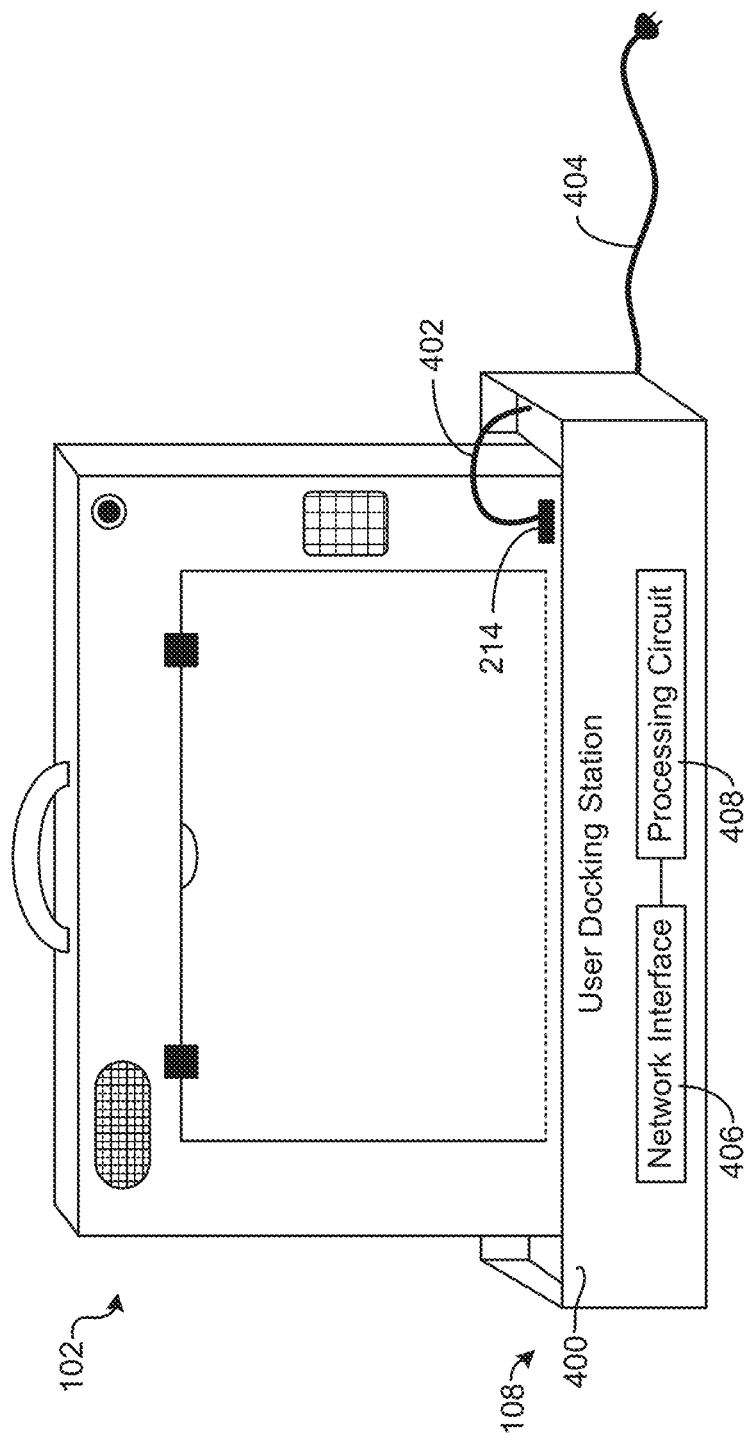
FIG. 4 is an illustration of a user docking station of the system of FIG. 1, according to an exemplary embodiment.

The user docking station 108 is coupleable to the portable locker 102 (e.g., the portable locker 102 is removably coupled to the user docking station 108). In some embodiments, the portable locker is configured to open only when coupled to the user docking station 108 and/or positioned proximate the user docking station 108. An example embodiment of the user docking station 108 is shown in FIG. 4 and described in detail with reference thereto. The user docking station 108 may be located at a user facility (e.g., a place of business, a home) to allow the portable locker 102 to be secured at the user facility. The user docking station 108 may substantially prevent theft of the portable locker 102 from the user facility.

The provider computing system 110 provides various security, tracking, ordering, and accounting functions for the system 100. As shown in FIG. 1, the provider computing system 110 includes a tracking and security circuit 114 and an accounts circuit 116. According to various embodiments, the provider computing system 110 is hosted on a remote server (e.g., a cloud computing resource), included locally with the provider docking station 106, distributed amongst the provider docking station 106, the portable locker 102, the user device 104, and/or the user docking station 108, or some combination thereof.

The tracking and security circuit 114 facilitates tracking of portable lockers 102. For example, in some embodiments the tracking and security circuit 114 receives location data (e.g., GPS coordinates) from one or more portable lockers 102. The tracking and security circuit 114 uses the location data to maintain a database and/or map of the locations of the one or more portable lockers. The tracking and security circuit 114 may provide the location of a portable locker 102 to a manager/owner of a business to allow the manager/owner to track the progress of an employee/courier transporting the portable locker. The tracking and security circuit 114 may also provide the location of the portable locker 102 to a law enforcement official in case of a suspected theft. In some embodiments, the tracking and security circuit 114 stores locations corresponding to user destinations (e.g., user facilities) corresponding to locations where the portable lockers 102 are allowed to be opened. The tracking and security circuit 114 may prevent a portable locker 102 from being unlocked or opened if the portable locker 102 is not located at a user destination.

The tracking and security circuit 114 also checks user permissions to retrieve a portable locker 102 from the provider docking station 106 and/or the user docking station 108 and to open the portable locker 102. The tracking and security circuit 114 may store user profiles that associated user permissions with identifying information relating to the user, for example one or more biometrics of the user (e.g., fingerprint(s), handprint(s), retinal scan, facial characteristics), a username, ID number, password, pin, security questions/answers, etc. The tracking and security circuit 114 may generate a graphical user interface accessible via the network 112 (e.g., a website accessible via the internet) that allows a user to create a profile. The graphical user interface may also allow a user to manage permissions for one or more users, for example to allow a manager to define the permissions of one or more employees.

In some embodiments, the tracking and security circuit 114 is configured to receive an indication from the provider docking station 106 or the user docking station 108 that a user is requesting to remove the portable locker 102 from a docking station 106, 108. The tracking and security circuit 114 may also receive user-identifying information from the relevant docking station 106, 108, for example biometric information collected from the user by the docking station 106. The tracking and security circuit 114 may then compare the user-identifying information to the permissions information stored by the tracking and security circuit 114 to determine whether the user has permission to take the requested portable locker 102. In response to a determination, the tracking and security circuit 114 may transmit an approval or denial as appropriate to the docking station 106, 108.

In some embodiments, the tracking and security circuit 114 is configured to receive an indication from the portable locker 102 that a user is requesting to access the contents of the portable locker 102 (e.g., to unlock and open the portable locker 102). The tracking and security circuit 114 may also receive user-identifying information from the portable locker 102, for example biometric information collected from the user by the portable locker 102. The tracking and security circuit 114 may then compare the user-identifying information to the permissions information stored by the tracking and security circuit 114 to determine whether the user has permission to open the portable locker 102. The tracking and security circuit 114 may also collect location information from the portable locker 102 and compare the location information to a database of preset user destinations. In response to a determination that the user has permission to open the portable locker 102 and that the portable locker 102 is located at a user destination, the tracking and security circuit 114 may cause the portable locker 102 to allow a user to access the contents thereof. In response to a determination that the user does not have permission to open the portable locker 102 or that the portable locker 102 is not located at a user destination, the tracking and security circuit 114 may cause the portable locker 102 to prevent access to the contents thereof. The provider computing system 110 thereby facilitates controlling access to the portable lockers 102 and the contents thereof The accounts circuit 116 facilitates withdrawals from customer bank accounts or other funds accounts to reflect withdrawals provided to a user in a portable locker 102 at the provider docking station 106 and deposits to customer bank accounts or other funds accounts to reflect deposits returned to the provider docking station 106 in a portable locker 102 by a user.

In some embodiments, the accounts circuit 116 is configured to receive an order from a user for a withdrawal (e.g., ordered contents such as cash of a variety of denominations) to be placed in a portable locker 102 at the provider docking station 106. The order may be input by the user via the user device 104 or another device on a graphical user interface provided by the provider computing system 110 via the network 112. The accounts circuit 116 causes a value of a customer bank account (e.g., a checking account, a demand deposit account, etc.) to decrease by an amount of the order. The accounts circuit 116 controls the provider docking station 106 to fill a portable locker 102 with the ordered contents and store the portable locker 102 for pick-up by a user associated with the order.

In some embodiments, the accounts circuit 116 is configured to receive an inventory of the contents of a portable locker 102 returned by a user to the provider docking station 106. The inventory may indicate a total value of cash in the portable locker 102 and/or information relating to checks in the portable locker 102. The accounts circuit 116 may cause a value of a customer bank account to increase by the total value of the cash in the portable locker 102. The accounts circuit 116 may also process the information relating to the checks to identify an account number, routing number, and amount relating to each check. The accounts circuit 116 may then initiate a transfer of funds as indicated by the check. The accounts circuit 116 thereby facilitates automatic deposit of cash and checks returned to the provider docking station 106 in a portable locker 102.

Figure 2:
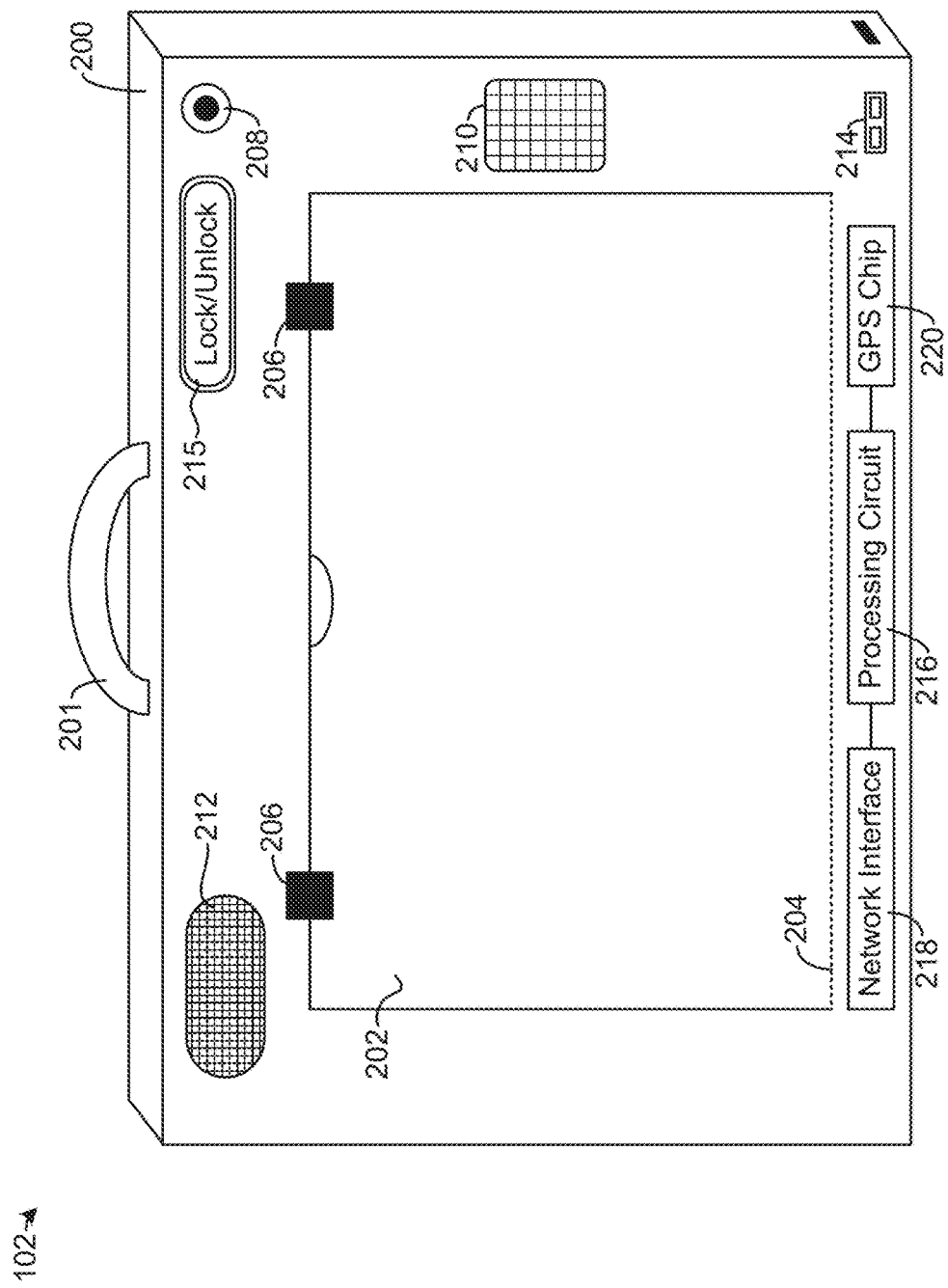
FIG. 2 is an illustration of a portable locker of the system of FIG. 1, according to an exemplary embodiment.

Referring now to FIG. 2, an illustration of a portable locker 102 is shown, according to an exemplary embodiment. It should be understood that the design of the portable locker 102 is highly configurable and that the embodiment shown in FIG. 2 is included for illustrative purposes. For example, in some embodiments the system 100 includes various portable lockers 102 of various designs, sizes, and configurations.

The portable locker 102 is shown to include a case 200 coupled to a lid 202 by a hinge 204, locks 206 coupled to the lid 202 and/or the case 200, a camera 208 coupled to the case 200, a biometric sensor 210 coupled to the case 200, a speaker 212 coupled to the case 200, a charging port 214 positioned on the case 200, and a lock/unlock button 215 positioned on the case 200. The portable locker 102 is also shown to include a processing circuit 216, a network interface 218, and GPS chip 220.

The case 200 and the lid 202 enclose a compartment configured to contain contents, for example cash, checks, coins, or other valuable items. The case 200 and the lid 202 may be manufactured from metal and/or one or more other substantially impenetrable, burglary-resistant materials. In some embodiments, the compartment contains one or more removable sub-lockers. For example, a second portable locker 102 may be stored within the compartment of a first portable locker 102. The case 200 includes a handle 201 to facilitate carrying of the case 200.

The lid 202 is openable to allow access to the contents of the portable locker 102. As shown in FIG. 2, the lid 202 is rotatably coupled to the case 200 by a hinge 204. The lid 202 may be rotated open about an axis defined by the hinge 204 to reveal the contents of the portable locker 102.

The locks 206 are coupled to at least one of the case 200 and the lid 202. The locks 206 are controllable between a locked position, where the locks 206 are locked to prevent the lid 202 from opening and an unlocked position, where the locks 206 allow the lid 202 to open. The locks 206 may include any type or types of locks (e.g., cam lock, bolt lock, electromagnetic lock, etc.). Although two locks 206 are shown in FIG. 2, any number of locks 206 may be included with the portable locker 102. The locks 206 are communicable with and controllable by a processing circuit 216 of the portable locker 102. The locks 206 are configured to lock and unlock in response to control signals from the processing circuit 216.

The camera 208 is configured to capture a photo and/or video of a user or burglar interacting with the portable locker 102. For example, in some embodiments the camera 208 captures a photo each time the lid 202 is opened. As another example, in some embodiments the camera 208 continuously captures a live video feed and provides the video feed to the user device 104 and/or the provider computing system 110 via a network interface 218 of the portable locker 102. As another embodiment, the camera 208 captures a photograph of a user in response to a request/attempt to open the case. A facial recognition algorithm may be applied to the photograph to verify the user's identity.

The biometric sensor 210 is configured to collect one or more biometrics from a user and provide the one or more biometrics to the processing circuit 216 and/or the provider computing system 110 (via network interface 218 and network 112). The biometric sensor 210 may include one or more of a fingerprint scanner, handprint scanner, retinal scanner, etc., to collect one or more of a fingerprint, handprint, retinal scan, etc. from a user. The biometric sensor 210 thereby facilitates verification of the identity of the user in a security and authentication process.

The speaker 212 is configured to emit sound relating to the portable locker 102. For example, in some scenarios (e.g., in response to a burglary attempt, in response to a displacement of the portable locker 102 from the user device 104 beyond a threshold range) the processing circuit 216 may control the speaker 212 to emit an alarm sound. The speaker 212 may also provide various other audible notifications to a user, for example instructions on how to provide biometric information to the portable locker 102 or take other steps in using the portable locker 102.

The charging port 214 is electronically coupled to a rechargeable battery (not shown) of the portable locker 102. For example, the charging port 214 may be a USB port, micro-USB port, or other standard output port. The charging port 214 is coupleable to a power source (e.g., a standard wall outlet, a power source included with the provider docking station 106 or the user docking station 108) via a charging cable to provide electrical power to the battery. The battery provides electrical power for the various electronic components of the portable locker 102. The charging port 214 thereby facilitates repeated use of the portable locker 102. In some embodiments, the charging port 214 provides for the transfer of data from the portable locker 102 to the user docking station 108 via a connector cable connected to the charging port 214.

The lock/unlock button 215 allows the user to request that the locks 206 switch from locked to unlocked or vice versa. That is, if the locks 206 are locked (preventing the lid 202 from opening), a user may press the button 215 to request that the locks 206 be unlocked so that the lid 202 may be opened. If the locks 206 are unlocked, a user may press the button 215 to request that the locks 206 be locked to prevent the lid 202 from opening. The lock/unlock button 215 is communicably coupled to the processing circuit 216 to transmit the user request input via the lock/unlock button 215 to the processing circuit 216. As discussed further below with reference to FIG. 5, the processing circuit 216, in communication with the provider computing system 110, is configured to determine whether the individual attempting to access the portable locker 202 is authorized to do so based on biometric data collected by the biometric sensor 210 and control the operation of the locks 206 accordingly.

The GPS chip 220 is operable to provide the current GPS coordinates of the portable locker 102 to the processing circuit 216. The GPS chip 220 may take periodic samples of the GPS coordinates of the portable locker (e.g., once per minute, once per hour, etc.) and/or may determine the current GPS coordinates of the portable locker 102 on demand from the processing circuit 216 (e.g., in response to a request to unlock the locks 206).

The processing circuit 216 controls the operation of the portable locker 102, including controlling the locks 206, the camera 208, the biometric sensor 210, the speaker 212, and the GPS chip 220 to execute the functions described herein. For example, the processing circuit 216 may control the operation of the portable locker 102 to perform the steps shown in FIG. 5 and described in detail with reference thereto below.

The network interface 218 provides for communication between the portable locker 102 and the user device 104, the provider docking station 106, the user docking station 108, the provider computing system 110, and the network 112. The network interface 218 may include a cellular modem that allows direct connection between the network interface 218 and the network 112. The network interface 218 may also or alternatively include a Bluetooth transceiver/beacon, a near-field communication transmitter, a radio-frequency identification transceiver, or some other component for facilitating communication with the network 112 and/or the user device 104. In some embodiments, the network interface 218 provides for communication between the portable locker 102 and the user device 104 (e.g., via Bluetooth) and utilizes a cellular modem of the user device 104 to communicate with the network 112. In some embodiments, the network interface 218 includes cryptography capabilities to establish a secure or relatively secure communication session.

Figure 3:
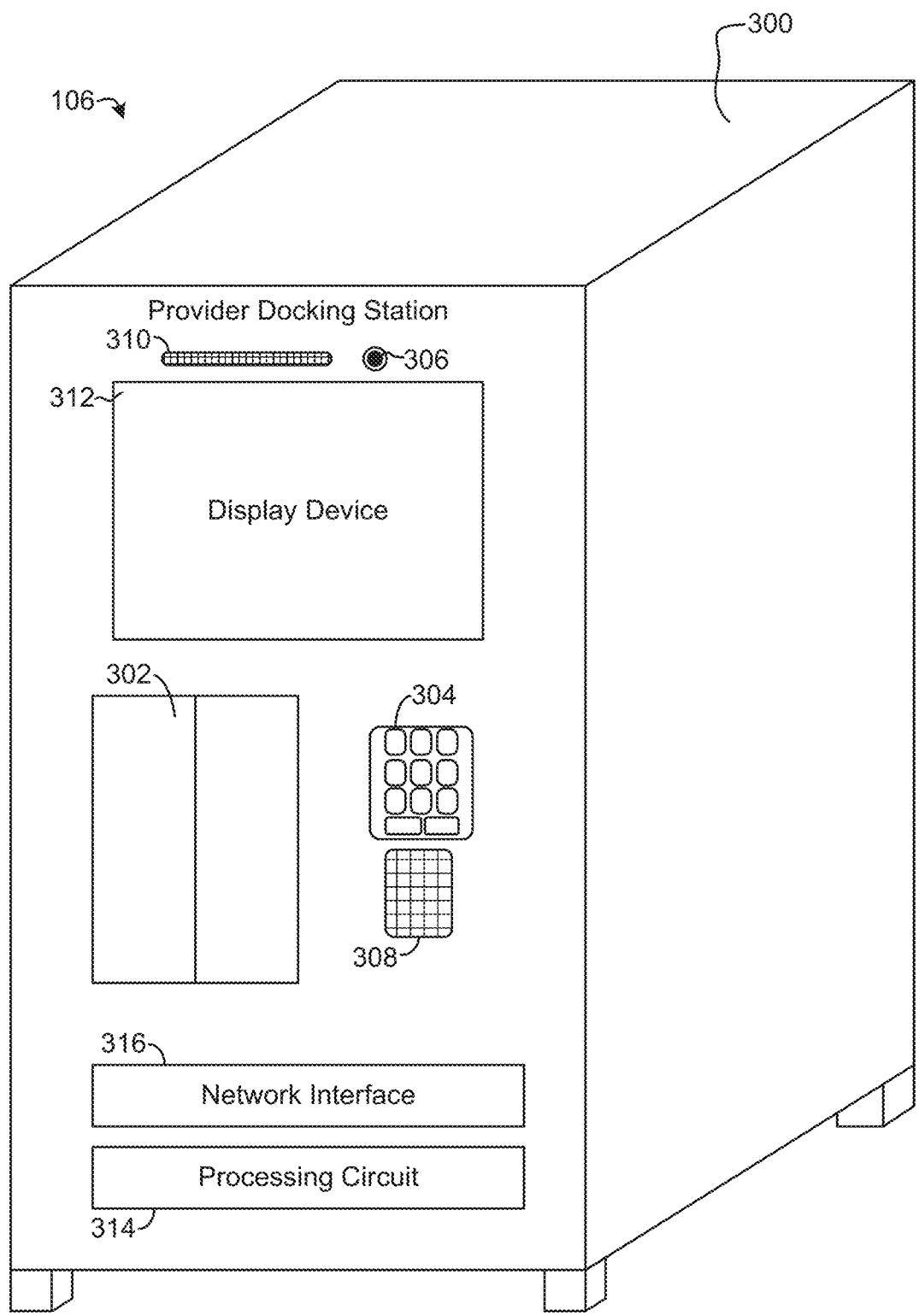
FIG. 3 is an illustration of a branch docking station of the system of FIG. 1, according to an exemplary embodiment.

Referring now to FIG. 3, an illustration of the provider docking station 106 is shown, according to an exemplary embodiment. It should be understood that the provider docking station 106 is highly configurable and that the embodiment shown in FIG. 3 is included for illustrative purposes.

The provider docking station 106 is shown to include a vault 300, access doors 302 coupled to the vault 300 and selectively providing access to an input/output region of the vault 300, a user input device 304 coupled to the vault 300, a camera 306 coupled to the vault 300, a biometric sensor 308 coupled to the vault 300, a speaker 310 coupled to the vault 300, and a display device 312 coupled to the vault 300. The provider docking station 106 is shown to also include a processing circuit 314 and a network interface 316.

The vault 300 is configured to contain multiple portable lockers 102. The vault 300 may be manufactured from metal and/or another substantially impermeable material. The vault 300 may be resistant to burglary attempts, for example conforming to Underwriters Laboratories standard UL 687. In some embodiments, the vault 300 securely stores cash, coins, checks, or other valuable items to be loaded into a portable locker 102 and/or removed from a portable locker 102. In some embodiments, the vault 300 may be configured to cause the locks 206 of a portable locker 102 to move to an unlocked position and to open the door 202 so that materials may be removed from or added to the portable locker 102. The vault 300 may also include various mechanisms for automatically counting, assessing, and handling such cash, coins, checks, and other valuable items. In some embodiments, the vault 300 includes various mechanisms, robotic components, etc. configured to automatically sort and reposition portable lockers 102 within the vault 300. For example, the vault 300 may be configured to retrieve a particular portable locker 102 from multiple portable lockers 102 stored in the vault 300 and position the particular portable locker 102 at the input/output region proximate the access doors 302 to allow a user to remove the particular portable locker 102 when the access doors 302 are open.

The access doors 302 selectively provide access to an input/output region (e.g., input/output slot, input/output compartment, input/output tray) of the vault 300. The access doors 302 are controllable by the processing circuit 314 of the provider docking station 106. The access doors 302 may be opened to allow a user to remove a portable locker 102 from the vault and/or to place a portable locker 102 in the vault 300 and closed to substantially prevent access to the interior of the vault 300. The access doors 302 may swing open, slid open, or open in some other way. The access doors 302 may substantially prevent a user from opening the access doors 302 unless controlled to open by the processing circuit 314.

The user input device 304 allows a user to input a request to take a portable locker 102 and input various information relating to the user or the portable locker 102, for example a user identification number, a pin, a password, an order number, etc. The user input device 304 may include a number pad, a keyboard, a touchscreen, or some other device configured to allow a user to input information.

The display device 312 is configured to display information to the user, for example to prompt the user to input various information via the user input device 304. In some embodiments, the display device 312 and the user input device 304 are combined as a single device (e.g., a touchscreen display). The display device 312 may in a digital display (e.g., LED display). The display device 312 may display various graphical user interfaces relating to the system 100, for example showing a status of the provider docking station 106, the location of a particular portable locker 102, information relating to an order, a balance of a customer bank account, etc.

The camera 306 is configured to capture a photograph and/or video of a user of the provider docking station 106. For example, the camera 306 may be controlled to capture a photo when a portable locker 102 is removed from the vault 300 to capture an image of the person taking possession of the portable locker 102. Accordingly, the camera 306 may be positioned and oriented to view a region proximate the access doors 302, i.e., a region where a user is likely to be positioned when removing a portable locker 102 from the vault 300.

The biometric sensor 308 is configured to collect one or more biometrics from the user. In various embodiments, the biometric sensor 308 includes one or more of a fingerprint scanner, a handprint scanner, a retinal scanner, etc. to collect one or more of fingerprints, handprints, retinal scans, etc. from users. The biometric sensor 308 provides the biometrics collected from users to the processing circuit 314 and/or the provider computing system 110 to facilitate authentication of the user's identity for security and/or other purposes.

The speaker 310 is configured to sound relating to operation of the provider docking station 106. The speaker 310 is communicable with the processing circuit 314 and controllable by the processing circuit 314. The speaker 310 may provide various audible alarms, instructions, notifications, etc. to facilitate operation of the system 100.

The processing circuit 314 is configured to control and/or accept input from the vault 300, the access doors 302, the user input device 304, the camera 306, the biometric sensor 308, the speaker 310, and the display device 312. The processing circuit 314 operates to cause the provider docking station 106 to execute the various functions described herein. For example, the processing circuit 314 may control the provider docking station 106 to execute the steps of process 600 shown in FIG. 6 and described in detail with reference thereto.

The network interface 316 facilitates communication between the provider docking station 106, the provider computing system 110, the user docking station 108, the portable lockers 102, and the user device 104 via the network 112. The network interface 316 may include may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 316 includes cryptography capabilities to establish a secure or relatively secure communication session.

Referring now to FIG. 4, an illustration of the user docking station 108 is shown according to an exemplary embodiment. It should be understood that the user docking station 108 is highly configurable and that the embodiment of FIG. 4 is included for illustrative purposes.

As shown in FIG. 4, the user docking station 108 includes a base 400, a connector cable 402, a power cable 404, a network interface 406, and a processing circuit 408. The base 400 is configured to receive the portable locker 102. In some embodiments, the base 400 is lockable to the portable locker 102. For example, the base 400 may include one or more hooks, bolts, latches, etc. controllable to lock into various slots, corners, edges, recesses, etc. included with various embodiments of the portable locker 102. In some embodiments, the base 400 includes an electromagnet locking system operable to generate a magnetic field that exerts a substantially unsurpassable force on the portable locker 102 to hold the portable locker 102 to the base 400. The base 400 may be anchored to a structure (e.g., wall, floor, etc.) and/or may be very heavy to substantially prevent movement of the base 400 (i.e., to resist theft of the user docking station 108).

The connector cable 402 connects the charging port 214 of the portable locker 102 to the user docking station 108. In some embodiments, the connector cable 402 provides for wired communication between the processing circuit 408 of the user docking station 108 and the portable locker 102. The portable locker 102 may thereby exchange information with the user docking station 108, for example user biometrics from the biometric sensor 210, photos/videos from the camera 208, control signals for the locks 206 and/or speaker 212, etc.

The power cable 404 allows the user docking station 108 to be connect to a power source, for example via a standard wall outlet. When connected to a power source, the power cable 404 provides power to the processing circuit 408, the network interface 406, and the base 400, as well as to the portable locker 102 via the connector cable 402. The power cable 404 may thereby facilitate charging of a battery of the portable locker 102.

The processing circuit 408 is operable to control the user docking station 108. In some embodiments, when the portable locker 102 is coupled to the user docking station 108, the processing circuit 408 executes functions attributed herein to the processing circuit 216 of the portable locker 102. The network interface 406 facilitates communication between the user docking station 108, and the provider docking station 106, the provider computing system 110, the portable locker 102, and/or the user device 104 via the network 112. The network interface 406 may include may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 406 includes cryptography capabilities to establish a secure or relatively secure communication session.

Figure 5:
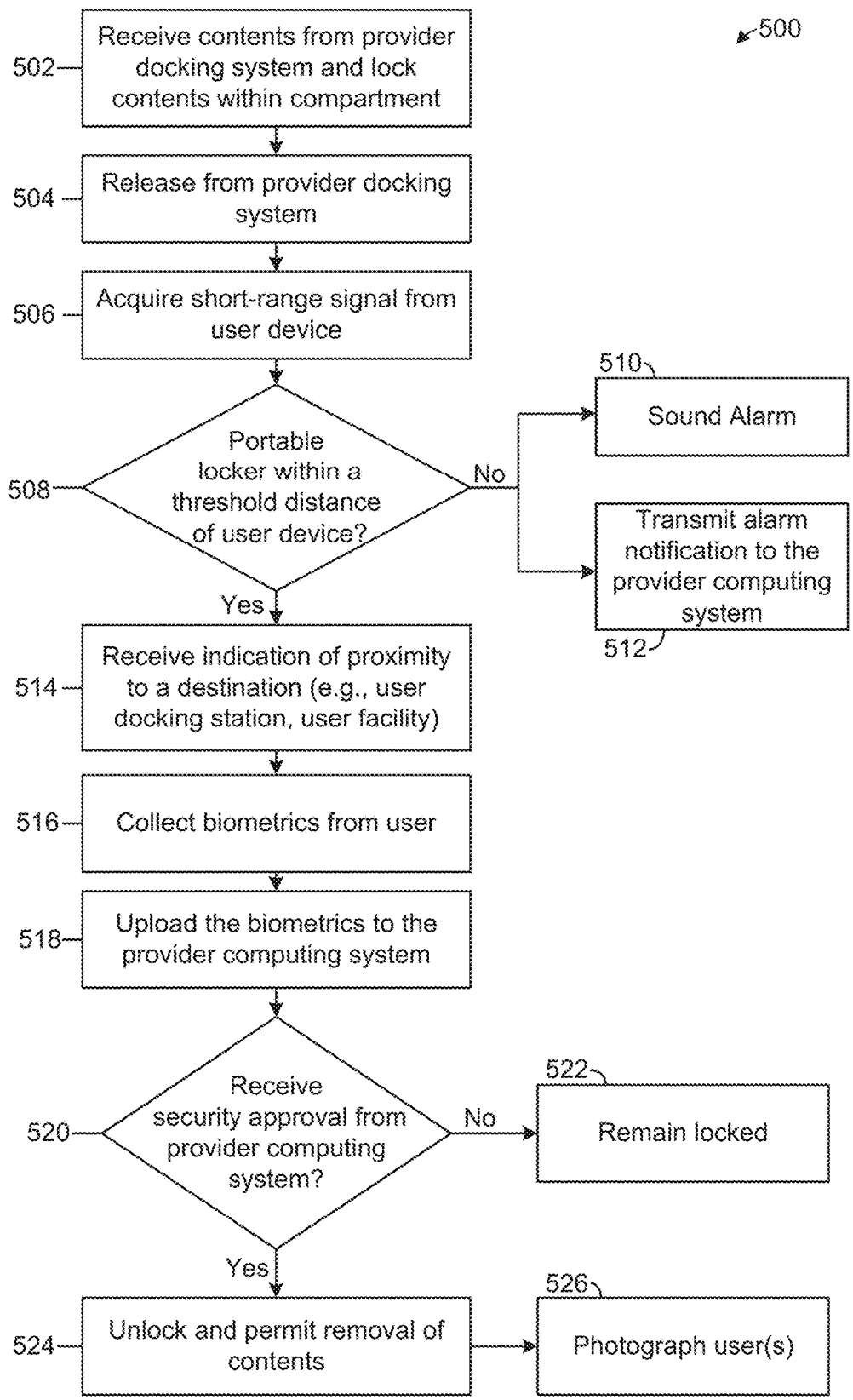
FIG. 5 is a flowchart of a process for secure transit of valuable, according to an exemplary embodiment.

Referring now to FIG. 5, a process 500 for secure transit of valuables using the portable locker 102 is shown, according to an exemplary embodiment. The process 500 can be executed by the portable locker 102. The process 500 begins with the portable locker 102 located within the vault 300 of the provider docking station 106.

At step 502, the portable locker 102 receives contents (e.g., cash, bills, coins, valuable items, etc.) from the provider docking station 106 and locks the contents within a compartment of the portable locker 102. For example, in an embodiment where the portable locker 102 is of the embodiment shown in FIG. 2, the portable locker 102 may allow the contents to be added to be positioned within the case 200, allow the lid 202 to be closed, and lock the locks 206 to prevent the lid 202 from opening.

At step 504, the portable locker 102 is released from the provider docking station 106. For example, the portable locker 102 may be taken by a user from the vault 300 via the access doors 302 of the provider docking station 106.

At step 506, the portable locker 102 acquires a short-range signal emitted by the user device 104 (e.g., Bluetooth signal, RFID signal, etc.). Receiving the short-range signal at the portable locker 102 indicates that the portable locker 102 is within a particular range/distance of the user device 104 (i.e., within range of the signal).

At step 508, the portable locker 102 monitors whether the portable locker 102 remains within a threshold distance of the user device 104. For example, the portable locker 102 may determine whether the portable locker 102 continues to receive the short-range signal from the user device 104 acquired at step 506.

If the portable locker 102 determines that the portable locker 102 is not within a threshold distance of the user device (e.g., if the portable locker 102 loses the short-range signal from the user device 104), at step 510 the portable locker 102 sounds an audible alarm with the speaker 212 and, at step 512, transmits an alarm notification to the provider computing system 110. The provider computing system 110 may provide the alarm notification to a law enforcement official or emergency response system or to a manager/owner/employer associated with the user.

If the portable locker 102 remains within the threshold distance of the user device 104, the user may continue to bring the portable locker 102 from the provider docking station 106 to a destination. At step 514, the portable locker 102 may receive an indication of proximity of the portable locker 102 to a preset destination, for example a user facility or a location of the user docking station 108. For example, the GPS chip 220 of the portable locker 102 may provide current GPS coordinates of the portable locker 102 that match or substantially match GPS coordinates of the destination. As another example, the user docking station 108 may transmit an indication to the portable locker 102 (e.g., via the network 112, via the connector cable 402) indicating that the portable locker has reached the user docking station 108.

At step 516, the portable locker 102 collects biometrics from a user seeking to open/unlock the portable locker 102. For example, the user may push the lock/unlock button 215 and then be prompt (e.g., via speaker 212) to provide biometric data via biometric sensor 210. This user may be the same person as the courier who transports the portable locker 102 from the provider docking station 106 to the destination or may be another person. The portable locker 102 may collect the biometrics using the biometrics sensor 210 and/or the camera 208.

At step 518, the portable locker 102 uploads the biometrics to the provider computing system 110 via the network 112 for a security check. The provider computing system 110 compares the biometrics to store user profiles to determine an identity of the user based on the biometrics and check whether the user has permission to access the contents of the portable locker 102. If the user has permission, the provider computing system 110 transmits a security approval to the portable locker 102. If the user does not have permission or cannot be identified from the biometrics, the provider computing system 110 transmits a security denial to the portable locker 102.

At step 520, the portable locker 102 receives either a security approval or a security denial from the provider computing system 110. If the portable locker 102 receives a security denial (i.e., the portable locker 102 does not receive a security approval), at step 522 the portable locker 102 remains locked. If the portable locker 102 does receive a security approval, at step 524 the portable locker 102 unlocks and permits removal of the contents from the portable locker 102. For example, the locks 206 may be controlled to unlock and allow the lid 202 to be opened by a user. At step 526, the camera 208 is controlled to capture a picture(s) or video of the user or users that open the portable locker 102 and/or remove items from the portable locker 102, providing a visual record of who had access to the contents of the portable locker 102. The photos/videos may be transmitted to the provider computing system 110 and stored in the tracking and security circuit 114.

Figure 6:
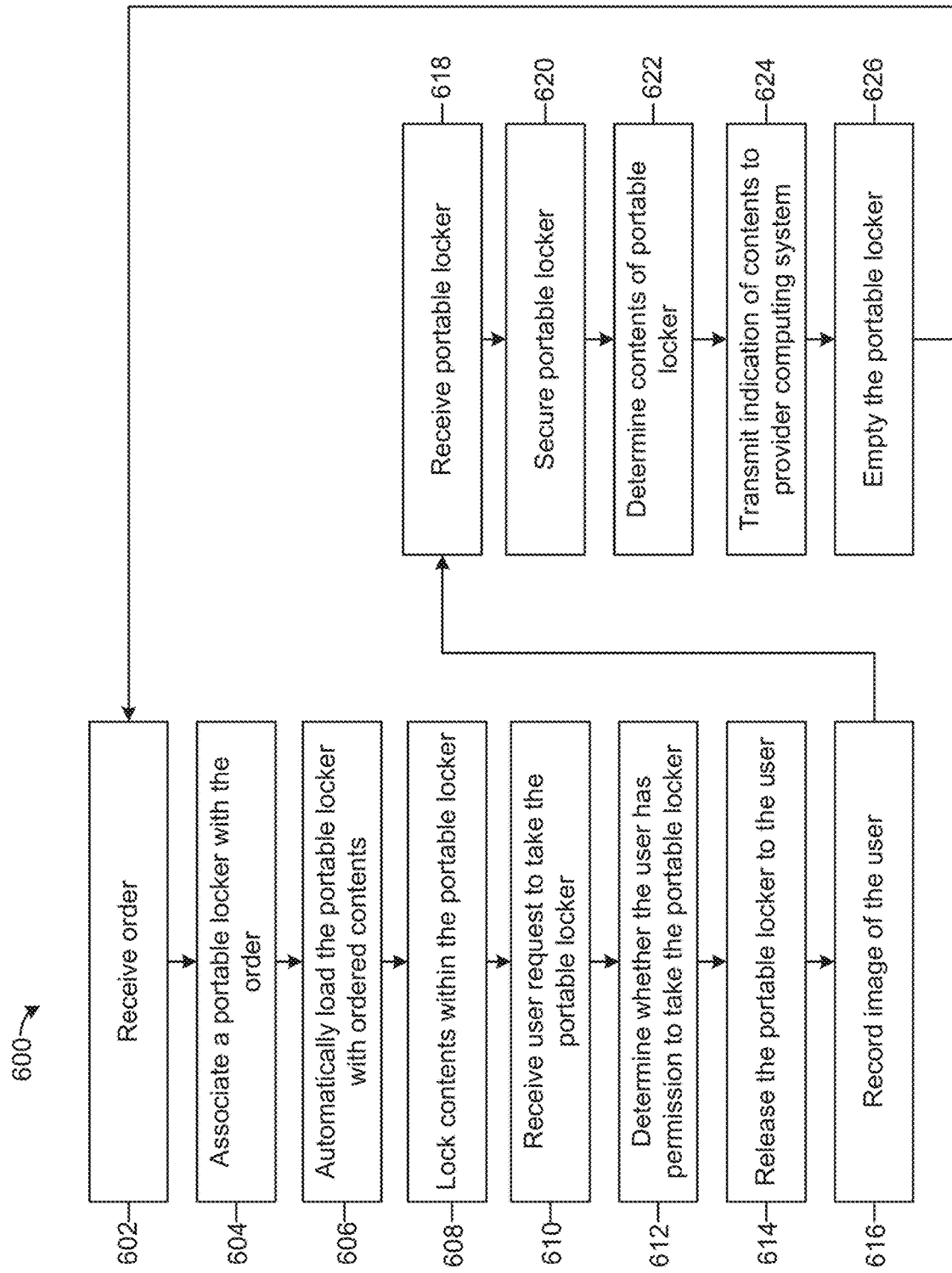
FIG. 6 is a flowchart of a process for secure storage, distribution, and handling of valuables, according to an exemplary embodiment.

Referring now to FIG. 6, a process 600 for securely storing, dispensing, and receiving valuables using the provider docking station 106 is shown, according to an exemplary embodiment. The process 600 can be executed by the provider docking station 106.

At step 602, the provider docking station 106 receives an order, for example from the provider computing system 110. The order specifies contents to be added to a portable locker 102. The order may also specify a user or set of users associated with the portable locker 102 and authorized to take the portable locker 102 from the provider docking station 106.

At step 604, the provider docking station 106 selects a portable locker 102 from multiple portable lockers 102 in the vault 300 and associates the portable locker 102 with the order. At step 606, the provider docking station 106 automatically loads the contents specified by the order into the selected portable locker 102. For example, the provider docking station 106 may open the lid 202, position the ordered contents in the case 200, and close the lid 202. At step 608, the provider docking station 106 locks the ordered contents in the portable locker 102, for example by controlling the locks 206 to lock and prevent the lid 202 from opening.

At step 610, the provider docking station 106 receives a user request to take the portable locker 102 containing the ordered contents. For example, the user may input the user request via the user input device 304 of the provider docking station 106. In some embodiments, the camera 306 captures a video of the user and automatically recognizes the user as associated with a particular order. The user may then merely have to approach the provider docking station 106 to input a request to take the portable locker 102.

At step 612, the provider docking station 106 determines whether the user has permission to take the portable locker 102. In some embodiments, the provider docking station 106 collects biometrics from the user using the biometric sensor 308 and/or the camera 306. In some embodiments, the provider docking station 106 collects a pin or password from the user via the user input device 304. The provider docking station 106 and/or the provider computing system 110 may then compare the biometrics, pin, password, and/or other information to stored user profile information to authenticate the user's identity and determine whether the user has permission to take the portable locker 102.

If the provider docking station 106 and/or the provider computing system 110 determines that the user has permission to take the portable locker 102, at step 614 the provider docking station 106 releases the portable locker 102 to the user. For example, the portable locker 102 may be retrieved from the vault 300 and positioned proximate the access doors 302, which may then be controlled to open to allow the user to take the portable locker 102. At step 616, the camera 306 captures an image/photograph of the user taking the portable locker 102. The image may be provided to the tracking and security circuit 114 for storage.

The portable locker 102 may then be transported to a user facility, where the contents may be removed, for example as described with reference to FIG. 5. A user or users may then place new contents in the portable locker 102 for return to the provider docking station 106. The new contents for return may include a deposit, for example cash and checks to be deposited into a bank account associated with the user. A user may then transport the portable locker 102 back to the provider docking station 106 (or, in some implementations, to another provider docking station 106 in a network of provider docking stations 106).

At step 618, the provider docking station 106 receives the returning portable locker 102. For example, the provider docking station 106 may open the access doors 302 and allow the user to insert the portable locker into the vault 300 through the access doors 302. At step 620, the provider docking station 106 secures the portable locker 102 within the vault 300, for example by closing the access doors 302.

At step 622, the provider docking station 106 determines/identifies the returned contents contained in the returned portable locker 102. The provider docking station 106 may unlock and open the portable locker 102 and remove the contents. The provider docking station 106 may then scan or image the contents or otherwise collect data relating to the contents. In some embodiments, the provider docking station 106 processes the scans, images, and/or other data to determine the total value of cash in the portable locker 102 and to identify transaction information from checks included in the contents.

At step 624, the provider docking station 106 transmits an indication of the contents to the provider computing system 110. The indication may include raw scan, image, or other data collected on the contents and/or may indicate the total value of contents and information relating to checks included in the contents. The provider computing system 110 may then initiate the execution of a deposit to a customer bank account and/or initiate the execution of transfers based on the indication of the contents received from the provider docking station 106.

At step 626, the provider docking station 106 empties the portable locker 102, preparing the portable locker 102 to be refilled according to a new order at step 606. The contents of the portable locker 102 may be automatically sorted into an inventory of valuable items (e.g., bills, coins) stored by the provider docking station 106 for use in fulfilling later orders. Some or all of the contents may also be destroyed by the provider docking station 106 (e.g., by a shredder or incinerator included in the provider docking station 106) and/or dispensed from the provider docking station 106 to a teller or other representative of the provider entity. The provider docking station 106 may include a teller access panel that allows a teller or other representative of the provider entity to manually restock the inventory of valuable items and/or remove materials from the provider docking station 106.

The system 100 thereby provides for secure order fulfillment, transportation, handling, and returns that substantially reduce the risk of successful burglary or misappropriation attempts, among other advantages.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. A system, comprising:
   a portable locker;
   a docking station configured to automatically load contents into the portable locker so that the contents are locked within the portable locker when the portable locker is positioned at the docking station;
   wherein the portable locker is configured to prevent access to the contents until the portable locker reaches a preset destination; and
   wherein the portable locker is configured to generate an alarm and notify a remote server in response to a determination that the portable locker is not within a threshold range of a user device during transit from the docking station to the predefined destination.

2. The system of claim 1, wherein the docking station is configured to:
   secure the portable locker to the docking station;
   collect a retinal scan of a user requesting the portable locker;
   verify access rights of the user requesting the portable locker based on the retinal scan; and
   release the portable locker to the user.

3. The system of claim 1, wherein the docking station is further configured to:
   receive order information indicating the contents to load into the portable locker; and
   load the contents into the portable locker in accordance with the order information.

4. The system of claim 3, further comprising a user device configured to receive user input indicating the order information and transmit the order information to the docking station.

5. The system of claim 3, wherein the contents comprise cash withdrawn from a bank account and the docking station is further configured to cause an update of a value of the bank account in a provider computing system in accordance with the order information.

6. The system of claim 1, wherein:
   the portable locker comprises a speaker;
   the portable locker is configured to generate the alarm by emitting an audible alarm from the speaker in response to a determination that the portable locker is not within the threshold range of the user device during transit from the docking station to the predefined destination;
   the system comprises the remote server, the remote server associated with a provider of the system; and wherein portable locker is configured to notify the remote computing by wirelessly transmitting a threat notification to the remote server.

7. The system of claim 1, wherein the portable locker comprises a GPS chip configured to take periodic samples of the GPS coordinates of the portable locker, wherein the portable locker is configured to determine whether the portable locker is located at the preset destination by comparing the GPS coordinates of the portable locker to stored GPS coordinates of the preset destination.

8. The system of claim 1, further comprising a user docking station, wherein the portable locker is dockable to the user docking station;
wherein the portable locker is configured to determine whether the portable locker is located at the preset destination by determining whether the portable locker is docked at the user docking station.

9. The system of claim 1, wherein the portable locker is configured to capture a photo when the contents are accessed.

10. A method, comprising:
securing a portable locker to a docking station;
automatically loading, by the docking station, contents into the portable locker such that the contents are locked within the portable locker;
receiving, by the docking station, a request from a user to take the portable locker;
in response to a determination that the user has permission to take the portable locker, releasing the portable locker from the docking station;
determining whether the portable locker is within a threshold distance from a device of the user; and
in response to a determination that the portable locker is beyond the threshold distance from the device of the user, emitting an alarm from the portable locker and transmitting a threat notification from the portable locker to a remote server.

11. The method of claim 10, further comprising preventing, by the portable locker, access to the contents unless the portable locker is at a preset destination for the portable locker by periodically collecting, by the portable locker, GPS coordinates of the portable locker.

12. The method of claim 10, comprising:
collecting, by the portable locker, biometrics from a person, the biometrics comprising a retinal scan and a handprint;
determining, based on the biometrics, whether the person has permission to access the contents of the portable locker;
allowing access to the contents in response to a determination that the person has permission to access the contents of the portable locker.

13. The method of claim 10, further comprising contacting, by the remote server, a manager of the user in response to the threat notification.

14. The method of claim 10, further comprising contacting, by the remote server, a law enforcement official in response to the threat notification.

15. The method of claim 10, further comprising:
receiving the portable locker at the docking station;
in response to receiving the portable locker at the docking station, automatically determining, by the docking station, pre-existing contents of the portable locker.

16. The method of claim 15, further comprising adding a value of the pre-existing contents of the portable locker to a user account and removing the pre-existing contents from the portable locker.

17. A system, comprising:
a cloud computing resource;
a plurality of portable lockers; and
a docking station configured to:
automatically load contents into the plurality of portable lockers at the vault in accordance with a plurality of orders associated with a plurality of users;
release a first portable locker of the plurality of portable lockers to a first user of the plurality of users, wherein the first portable locker contains first contents in accordance with a first order associated with the first user;
wherein each of the plurality of portable lockers is configured to emit an alarm and transmit a threat notification to the cloud computing resource in response to determining, after release from the docking station, that the portable locker is not within range of a signal from a user device.

18. The system of claim 17, wherein the cloud computing resource is programmed to notify a law enforcement official in response to the threat notification.

19. The system of claim 17, wherein the docking station is configured to select the first portable locker from the plurality of portable lockers for release to the first user based on biometric information of the first user collected by the docking station.

20. The system of claim 17, wherein a plurality of destinations are associated with the plurality of portable lockers, and wherein each of the plurality of portable lockers is configured to prevent access to the contents of the portable locker unless the portable locker is at the destination of the plurality of destinations associated with the portable locker based on GPS coordinates of the portable lockers periodically sampled by the portable lockers.

* * * * *